(12) United States Patent
Kobitzsch et al.

(10) Patent No.: US 11,486,717 B1
(45) Date of Patent: Nov. 1, 2022

(54) GENERATING NAVIGATION INSTRUCTIONS BASED ON DIGITAL MAP CONTEXT

(71) Applicant: Mapbox, Inc., San Francisco, CA (US)

(72) Inventors: Moritz Kobitzsch, Karlsruhe (DE); Daniel Hofmann, Berlin (DE)

(73) Assignee: Mapbox, Inc., Washington, DC (US)

( * ) Notice: Subject to any disclaimer, the term of this patent is extended or adjusted under 35 U.S.C. 154(b) by 409 days.

(21) Appl. No.: 15/919,818

(22) Filed: Mar. 13, 2018

Related U.S. Application Data

(60) Provisional application No. 62/470,794, filed on Mar. 13, 2017.

(51) Int. Cl.
| | | |
|---|---|---|
| G01C 21/34 | (2006.01) | |
| G01C 21/36 | (2006.01) | |
| G06F 16/29 | (2019.01) | |

(52) U.S. Cl.
CPC ..... *G01C 21/3407* (2013.01); *G01C 21/3446* (2013.01); *G01C 21/3658* (2013.01); *G01C 21/3661* (2013.01); *G01C 21/3667* (2013.01); *G06F 16/29* (2019.01)

(58) Field of Classification Search
CPC ....................................................... G06F 16/29
See application file for complete search history.

(56) References Cited

U.S. PATENT DOCUMENTS

| | | | | | |
|---|---|---|---|---|---|
| 5,809,447 | A | * | 9/1998 | Kato | G01C 21/3629 340/996 |
| 6,018,697 | A | * | 1/2000 | Morimoto | G08G 1/096872 701/428 |
| 6,061,628 | A | * | 5/2000 | Hayashi | G08G 1/096811 340/995.27 |
| 6,212,474 | B1 | * | 4/2001 | Fowler | G01C 21/3626 701/431 |
| 6,308,177 | B1 | * | 10/2001 | Israni | G01C 21/32 701/461 |
| 6,510,379 | B1 | * | 1/2003 | Hasegawa | G01C 21/20 340/988 |
| 7,054,745 | B1 | * | 5/2006 | Couckuyt | G01C 21/26 340/995.27 |
| 7,065,448 | B1 | * | 6/2006 | Gearhart | G08G 1/096861 701/538 |
| 7,076,363 | B1 | * | 7/2006 | Schmitz | G01C 21/3632 701/538 |
| 10,281,283 | B2 | * | 5/2019 | Cummings | G01C 21/26 |

(Continued)

*Primary Examiner* — Maceeh Anwari
(74) *Attorney, Agent, or Firm* — Fenwick & West LLP

(57) ABSTRACT

In order to determine navigation instructions, a mapping server can use digital map data, which can include a set of intersections connected by road segments. In some cases, the mapping server generates navigation guidance data for one or more intersections of digital map data. Responsive to a request for navigation instructions from a client device, the mapping server can generate a navigation route between an origin and destination location, and a corresponding set of navigation instructions can be generated based on the navigation route. In some implementations, the generated navigation instructions are then modified to clarify or otherwise improve the quality of the navigation instructions. Finally, the finalized navigation instructions can be sent to a client device for display to the requesting user.

12 Claims, 7 Drawing Sheets

(56) References Cited

U.S. PATENT DOCUMENTS

| | | | | |
|---|---|---|---|---|
| 2001/0037176 | A1* | 11/2001 | Mikame | G01C 21/3632 340/955 |
| 2002/0053984 | A1* | 5/2002 | Yamashita | G08G 1/0969 340/988 |
| 2003/0156049 | A1* | 8/2003 | Behr | G08G 1/096811 340/995.27 |
| 2005/0102102 | A1* | 5/2005 | Linn | G01C 21/3682 701/411 |
| 2006/0015249 | A1* | 1/2006 | Gieseke | G08G 1/096872 340/995.19 |
| 2006/0212217 | A1* | 9/2006 | Sheha | G01C 21/367 340/995.23 |
| 2007/0100545 | A1* | 5/2007 | Morita | G01C 21/3632 701/437 |
| 2009/0018764 | A1* | 1/2009 | Ishibashi | G01C 21/3682 701/533 |
| 2009/0177388 | A1* | 7/2009 | Schmidt | G01C 21/3658 701/533 |
| 2009/0177706 | A1* | 7/2009 | Takahata | G01C 21/32 |
| 2009/0234847 | A1* | 9/2009 | Homma | G01C 21/3611 704/E15.005 |
| 2010/0268453 | A1* | 10/2010 | Otani | G01C 21/3655 701/533 |
| 2011/0106431 | A1* | 5/2011 | Tomobe | G01C 21/32 701/533 |
| 2011/0285717 | A1* | 11/2011 | Schmidt | G01C 21/3635 345/441 |
| 2012/0303265 | A1* | 11/2012 | Su | G01C 21/3697 701/428 |
| 2012/0303274 | A1* | 11/2012 | Su | G01C 21/3632 701/538 |
| 2013/0024109 | A1* | 1/2013 | Hosotani | G01C 21/3629 701/428 |
| 2013/0166197 | A1* | 6/2013 | Tseng | G01C 21/3644 701/426 |
| 2013/0311081 | A1* | 11/2013 | Yamakawa | G01C 21/34 701/428 |
| 2013/0322634 | A1* | 12/2013 | Bennett | G01C 21/3629 704/274 |
| 2013/0325342 | A1* | 12/2013 | Pylappan | G06F 3/04817 701/400 |
| 2013/0345975 | A1* | 12/2013 | Vulcano | G08G 1/096866 701/533 |
| 2014/0142849 | A1* | 5/2014 | Ziezold | G01C 21/3644 701/533 |
| 2015/0051830 | A1* | 2/2015 | Shami | G01C 21/3629 701/538 |
| 2015/0185026 | A1* | 7/2015 | Hightower | G08G 1/096861 701/538 |
| 2015/0192426 | A1* | 7/2015 | Foster | H04W 4/80 709/228 |
| 2016/0179841 | A1* | 6/2016 | Ford | G06F 16/213 701/532 |
| 2017/0016730 | A1* | 1/2017 | Gawrilow | G01C 21/30 |
| 2017/0122750 | A1* | 5/2017 | Pfeifle | G01C 21/32 |
| 2018/0135999 | A1* | 5/2018 | Kim | G01C 21/3635 |
| 2019/0154452 | A1* | 5/2019 | Kim | G01C 21/3632 |

\* cited by examiner

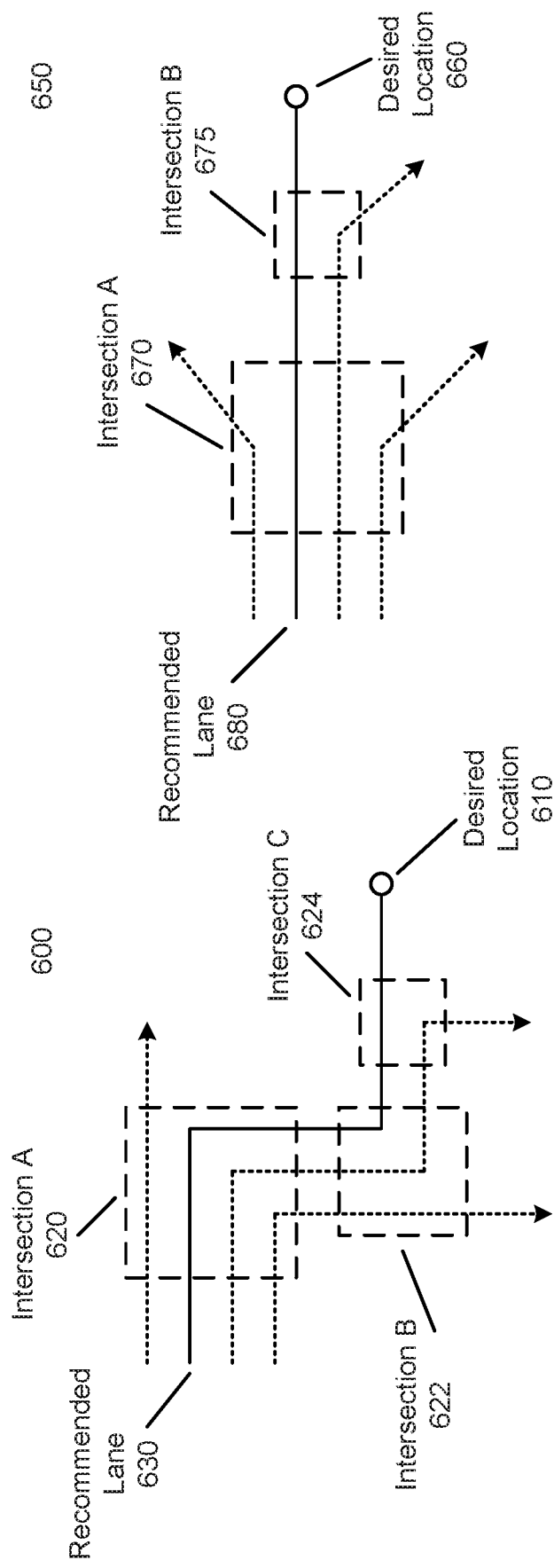

GENERATING NAVIGATION INSTRUCTIONS BASED ON DIGITAL MAP CONTEXT

This application claims priority to provisional patent application No. 62/470,794 filed on Mar. 13, 2017, the contents of which are hereby incorporated by reference.

FIELD OF THE DISCLOSURE

The technical field of the present disclosure generally relates to improved methods, computer software, and/or computer hardware in the field of electronic mapping. More specifically, the present disclosure relates to computer-implemented techniques for generating and modifying improved navigation instructions for use in a client map application.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Digitally stored electronic maps can be used to provide directions to users of mobile devices, for example, using any of a wide array of standalone digital map or direction application programs or apps. Digital map applications can correctly determine the location of a mobile device is (to an accuracy of a few feet or meters) and show in real time where the client device is located on a digital map. Digital map applications also typically include other functionality, such as providing turn by turn directions. Additional elements such as traffic conditions, accidents, or other notable events may also be displayed on a digital map.

When a digital map application requests navigation instructions, for example between two locations, a route may be calculated and turn instructions to be relayed to the user are generated for the route. Generated navigation instructions can be static instructions stored with electronic map data defining the digital map. The static instructions to the user do not change based on the route in which they are provided. For complex intersections or directions, static instructions may be inaccurate or repetitive in some situations. Thus, improved methods for determining and refining navigation instructions for digital maps are needed.

BRIEF DESCRIPTION OF THE DRAWINGS

FIGS. 6A and 6B illustrate example situation for recommending lanes using lane anticipation.

DETAILED DESCRIPTION

Figure 1:
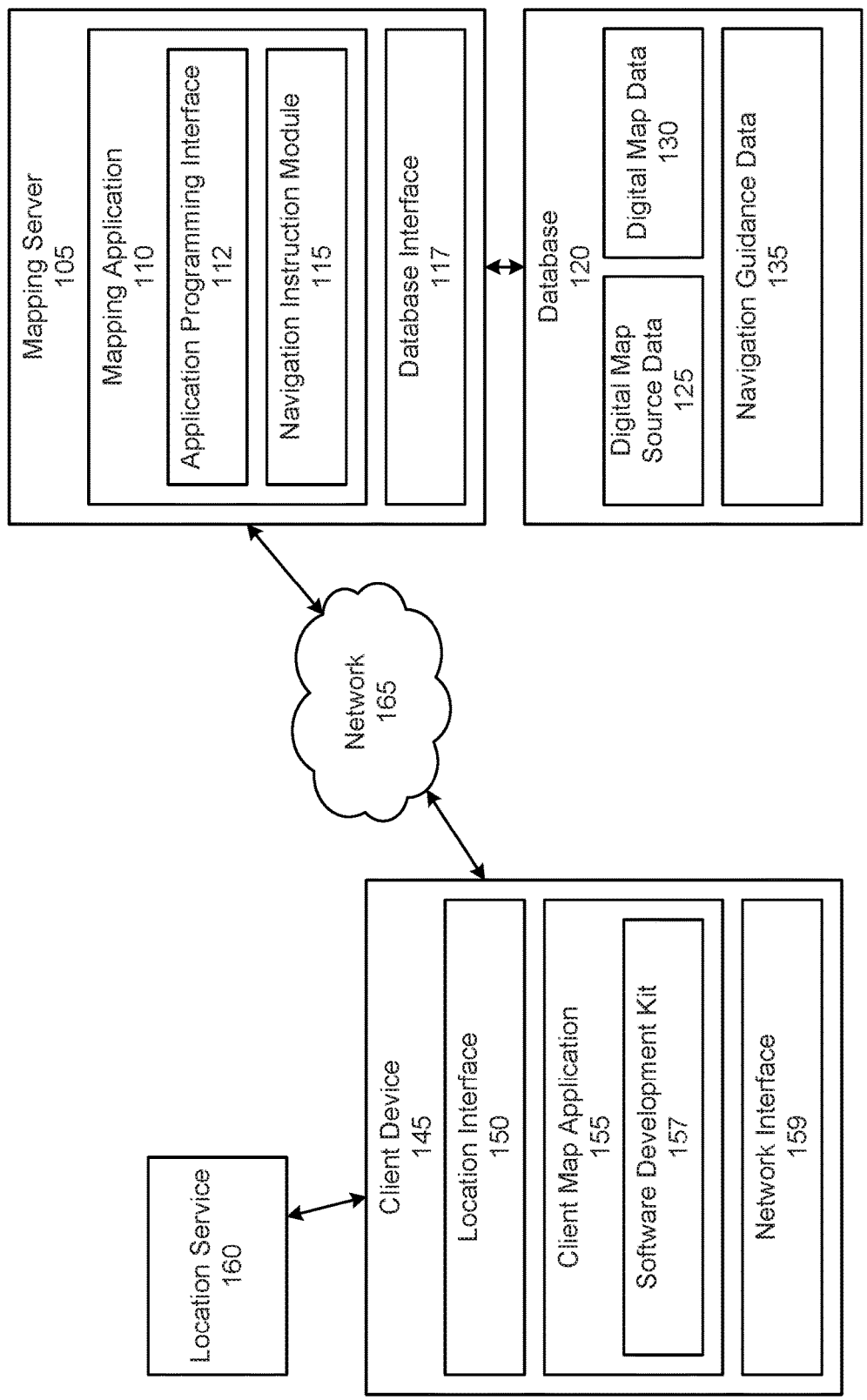
FIG. 1 is a block diagram illustrating an example system environment in which a mapping server and database operate, according to an example embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text and figures of this disclosure are intended to disclose the algorithms that are necessary to program a computer to implement the claimed inventions, at the level of detail used by people of skill in the arts to which this disclosure pertains to communicate about functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

General Overview

Computer-implemented techniques are provided for generating improved navigation instructions. In some embodiments, a mapping server can provide digital map functionality (for example generating navigation instructions) to one or more client devices. In some embodiments, based on received digital map data, intersection data representing a plurality of intersections and road segments can be determined. Similarly, navigation guidance data for one or more intersections of the plurality of intersections can be generated based on the intersection. In some embodiments, generating navigation guidance data for a particular intersection includes determining a shape of the particular intersection. Additionally, the shape of each intersection can be normalized to account for divided roads or other irregularities in the intersection shape. The normalized shape is associated with the particular intersection in the guidance data. Similarly, generating navigation guidance data for an intersection can include determining an intersection type of the particular intersection. In response to a request for navigation instructions between an origin and destination location (for example, received from a client device), a navigation route can be calculated from the origin location to the destination location. The mapping server can then generate a set of one or more navigation instructions for the route. In some implementations, the set of navigation instructions is then modified based on the generated navigation guidance data. Each navigation instruction can correspond to one or more specific intersections or road segments and instruct a user how to proceed at that point (for example, instructing a user to turn right at an intersection).

In some embodiments, modifying a navigation instruction includes analyzing one or more subsequent navigation instructions in the set of navigation instructions. Based on the analysis, the navigation instruction is restricted to one or more specific lanes. The associated navigation instruction can then be modified to recommend the specific lanes. Similarly, modifying a navigation instruction can include determining, based on the navigation guidance data, whether that navigation instruction is combinable. Based on the instruction type of each navigation instruction, that navigation instruction can be merged with one or more other navigation instructions or otherwise modified.

Other embodiments, aspects, and features will become apparent from the disclosure as a whole. These techniques have the benefit of generating clearer and more accurate navigation instructions based on contextual map data at or around road intersections. Therefore, embodiments can achieve greater flexibility in instruction calculation, selection, and display compared to systems that utilize pre-stored navigation instruction data. Additionally, guidance data can be pre-calculated and used when generating navigation instructions. This has the benefit of reducing processing time required for a server computer to generate navigation instructions and allowing guidance data to be generated based on additional information that may not be available when generating individual navigation instructions.

System Overview

FIG. 1 is a block diagram illustrating an example system environment in which a mapping server and database operate, according to one embodiment.

In some embodiments, the environment 100 comprises a plurality of components that may be implemented at least partially by hardware at one or more computing devices, such as one or more hardware processors executing stored program instructions stored in one or more memories for performing the functions that are described herein. In other words, in some embodiments, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

The environment 100 of FIG. 1 includes a client device 145 coupled to a location service 160 and coupled via a network 165 to a mapping server 105. The mapping server 105 additionally can be coupled to a database 120. The mapping server 105 can comprise a mapping application 110, including an application programming interface (API) 112 and a navigation instruction module 115, and a database interface 117. In some embodiments, the database 120 comprises digital map source data 125, digital map data 130, and navigation guidance data 135. The client device 145 can comprises a location interface 150, client map application 155 including a software development kit (SDK) 157, and a network interface 159.

In some embodiments, the client device 145 can be any mobile computing device capable of connecting to a mapping server 105. For example, the client device 145 can be a laptop, other hand-held or wearable computer, cellular or mobile phone or smartphone, portable digital assistant (PDA), portable navigation device, tablet computer, or other suitable device capable of running a client map application 155. For example, the client device 145 can be a navigation system installed in a car or other vehicle. Although a single client device 145 is depicted in FIG. 1, any number of client devices 145 may be present and/or connect to the mapping server 105. Each client device 145 can be communicatively connected to the mapping server 105 through the network 165 via any combination of a LAN, a WAN, one or more internetworks such as the public Internet, a cellular network, or a company network. The client device 145 can comprise applications, software, and other executable instructions to facilitate various aspects of embodiments described herein. These applications, software, and other executable instructions may be installed by a user, owner, manufacturer, or other entity related to client device 145.

In some embodiments, the client device 145 is communicatively coupled to a location service 160 through the location interface 150. The location service 160 is a server or other computing device which can provide information about the location of the client device 145. For example, the location service 160 can be a GPS satellite, system of GPS satellites, or any other suitable technology for determining the position of the client device 145. The location interface 150 can determine or approximate the location of the client device 145 based on information received from the location service 160. In some embodiments, the location interface 150 comprises a GPS transceiver used to receive signals from a plurality of GPS satellites (in this case represented by the location service 160) transmitting signals for resolution into a latitude-longitude position by the location interface 150 via triangulation calculations. In other embodiments, the location interface 150 determines or receives location information about the client device 145 through any other suitable method.

The client device 145 can include a client map application 155 which enables the client device 145 to displays, use, support, or otherwise provide digital mapping functionality to a user of the client device 145. For example, the client map application 155 can be a taxi service application, a video game, a chat client, a food delivery application, or any other suitable application using digital maps. In some embodiments, the client map application 155 obtains digital mapping functions through the SDK 157, which may implement functional calls, callbacks, methods, or other programmatic means for contacting the server computer to obtain digital map tiles, layer data, or other data that can form the basis of visually rendering a map as part of the client map application 155. The SDK 157 can be a software development kit that allows developers, for example developers of the client map application 155, to implement digital mapping functionality without having to design all of the components and features of the digital map from scratch. For example, the SDK 157 may be downloaded from the Internet by developers, and subsequently incorporated into a client map application 155 which is later used by individual users.

The client device 145 may also include a network interface 159 used by the client device 145 to communicate or interface with other devices or servers over the network 165. In some embodiments, the network interface 159 enables the client device 145 to send telemetry data to the mapping server 105 over the network 165. The network interface 159 may use WiFi, WiMAX, Bluetooth, ZigBee, cellular 4G, Ethernet, or any other suitable communication technology to connect the client device 145 to other devices or servers, for example via the network 165. Further, the client device 145 can also include other hardware elements, such as one or more input devices, memory, processors, and the like, which are not depicted in FIG. 1.

In some embodiments, the mapping sever 105 is any computing device, including but not limited to: servers, racks, work stations, personal computers, general purpose computers, laptops, Internet appliances, wireless devices, wired devices, multi-processor systems, mini-computers, and other suitable computing devices able to provide digital mapping functionality to a client device 145. Although FIG. 1 shows a single mapping server 105, the mapping server 105 can comprise one or more multiple server computers (such as a server cluster) located in one or more physical locations. Server computer 105 may also represent one or more virtual computing instances that execute using one or more computers in a datacenter such as a virtual server farm.

The mapping server 105 can be communicatively connected to the database 120 and the client device 145 through any suitable computer network using any combination of wired and wireless communication, including, but not limited to: a Local Area Network (LAN), a Wide Area Network (WAN), one or more internetworks such as the public Internet, or a company network. For example, the mapping server 105 can be connected to one or more client devices via the network 165. The mapping server 105 may host or execute a mapping application 110, and may include other applications, software, and other executable instructions, such as the database interface 117, to facilitate various aspects of embodiments described herein.

In one implementation, the database interface 117 of the mapping server 105 is a programmatic interface such as JDBC or ODBC for communicating with the database 120. In some embodiments, the database interface 117 can communicate with any number and type of databases, in any format. The database interface 117 may be a piece of customer software created by an entity associated with the mapping application 110, or may be created by a third party entity in part or in whole.

In one embodiment, the database 120 is a data storage subsystem consisting of programs and data stored on a suitable storage device. For example, the database 120 can store programs and data on one or more hard disk drives, memories, solid state storage, or any other suitable data recording device configured to store digital data. Although the database 120 is depicted as a single device in FIG. 1, the database 120 may span multiple storage devices or systems located in one or more physical locations. For example, the database 120 can comprise one or more nodes located at a data warehouse(s) and/or one or more nodes located at a remote location away from the data warehouse. Additionally, in some embodiments, the database 120 may be located on the same device(s) as the mapping server 105. Alternatively, the database 120 can be located on a separate device(s) or at a separate location from the mapping server 105.

The database 120 may be in any suitable database format, for example, the database 120 can be a relational database, a noSQL database, or a database of any other suitable format. The database 120 can be communicatively connected with the mapping server 105 through any suitable network connection using any combination of wired and wireless network of the type previously described. Optionally, the database 120 may be communicatively connected with other components or devices, either directly or indirectly, such as one or more third party data suppliers providing additional data to be stored in the database (and, for example, later accessed by the mapping server 105). In some embodiments, the database 120 stores data related to digital maps including, but not limited to: digital map source data 125, digital map data 130, and navigation guidance data 135. These datasets may be stored in the database 120, for example, as flat files or as columnar data in a relational database format.

In one embodiment, digital map source data 125 is raw digital map data that is obtained, downloaded, or received from a variety of sources. Raw digital map data may include satellite images, digital street data, building or place data, or terrain data. For example, raw digital map data can include data from the National Aeronautics and Space Administration (NASA), the United States Geological Survey (USGS), from DigitalGlobe, or from any other suitable store. In some implementations, raw digital map data may also be defined by a user of the mapping server 105 or of a connected client device 145 and uploaded to the mapping server 105. Digital map source data 125 may be updated at any suitable interval, and may be stored in the database 120 for any amount of time. Once obtained or received, digital map source data 125 can be used to generate digital map data 130.

In some embodiments, digital map data 130 is digital map data that is provided, either directly or indirectly, to client map applications, such as client map application 155, using an API, such as the API 112. Digital map data 130 can be generated based on digital map source data 125. Specifically, digital map source data 125, in some embodiments from a plurality of sources, is processed and organized as a plurality of vector map tiles to from digital map data 130. In some implementations, digital map data 130 may support "map styles" used to impose different display styles on maps generated based on the digital map data 130. Digital map data 130 may be updated at any suitable interval, and may include additional information beyond that derived from digital map source data 125.

In some embodiments, digital map data 130 is divided into a plurality of vector map wherein each map tile corresponds to a portion of a geographic map. For example, a map tile may correspond to a square area of a geographic map at a particular zoom level, or an area of a pre-defined size and location within a geographic map. In some implementations, map tiles can overlap, and may contain variable levels of detail about the associated geographical area. For example, a "low zoom level" map tile may correspond to a large geographic area, and contain a basic level of detail about the geographic area, while a "high zoom level" map tile may correspond to a much smaller geographic area (possible wholly contained within the area associated with the low zoom level map tile) but may contain a much higher level of detail about the corresponding area. In some embodiments, the digital map data associated with each map tile is organized in a compact, structured format, such as the Mapbox Vector Tile Specification format, by Mapbox, Inc., San Francisco, Calif. Additionally, digital map data 130 may comprise a plurality of map tile sets. A first set of map tiles may include digital map data 130 derived from a first set of digital map source data 125, while a second set of map tiles may include digital map data 130 derived from a second set of digital map source data 125.

In some embodiments, a map tile contains data describing map geometries, such as points, lines, and polygons, of features on the map. Additionally, a map tile can contain metadata, such as road names, place names, house numbers, feature types, and other properties of locations on the map. For example, digital map data of a vector map tile corresponding to a portion of a geographic map may include geometry data representing roads, buildings, water, parks, and etc. to be depicted within the portion of the geographic map, as well as geometries for suggested placement of labels and other cartographic features of the corresponding area. The map tile may also include metadata corresponding to each feature, such as names that can be rendered as labels on a digital map. Additionally, metadata for a map tile can include data indicating the area of the geographic map that the map tile corresponds to. For example, the metadata may include data indicating one or more coordinates of the map tile or one or more boundaries of the map tile.

In some embodiments, digital map data 130 is further organized into a plurality of data layers. Digital map data 130 may describe a plurality of map features, such as buildings, water, roads, and the like. Various map features may be grouped into the plurality of data layers. For example, a "road" data layer may include map features such as street, bridges, freeways, paths, and etc. As another example, a "water" data layer may include map features such as rivers, lakes, oceans, canals, and etc.

In some embodiments, map tiles are used by program libraries and SDKs, such as the SDK 157, as part of displaying maps on a mobile computing device or a browser. A map application (such as the client map application 155) or browser may request one or more map tiles and process the map tiles to display a visual map corresponding to the area associated with the map tiles.

According to some implementations, map tiles are rendered for display when requested by a client, such as a web browser or a mobile application. Rendering may be performed by a rendering library of a client map application or on a server computer. Example rendering libraries include, but are not limited to, Mapbox GL JS, available from Mapbox, Inc., San Francisco, Calif., the Mapbox iOS SDK, Mapbox Android SDK, the Mapbox GL native renderer, or through a Mapbox API. In some embodiments, map tiles are rendered based on a desired map style. Each map style of a plurality of map styles can be used to render the same map tile (including the same digital map data 130). That is, the same portion of digital map data may be displayed in a variety of visual styles. For example, in one map application, map tiles may be displayed with dark colors while in a second map application, map tiles may be displayed with light colors. In some embodiments, the digital map data 130 required to render a map tile in one map style may differ from the digital map data 130 required to render the same map tile in a different map style. For example, in the map system for a map application, roads within a map tile may be displayed while buildings are not displayed, therefore digital map data 130 about roads within the map tile is needed for rendering. However, in another map style, landscape and rivers may be displayed while roads are not displayed.

In an embodiment, navigation guidance data 135 is digital data that specifies information for one or more intersections of a digital map. In an embodiment, navigation guidance data 135 comprises road network data. Road network data may include intersection data defining a plurality of intersections of an electronic map and road segment data defining a plurality of road segments of the electronic map. In an embodiment, the road network data is stored as digital graph data that define a plurality of nodes, representing intersections in the road network, and a plurality of directed edges, representing road segments in the road network. In some implementations, the road network data is used to calculate paths between locations in the electronic map (for example, to generate navigation instructions).

In some embodiments, road segment data for a road segment includes indicators of an origin intersection and destination intersection for the road segment, a length of the road segment, a time value associated with traversing the road segment, and a direction of travel of the road segment, a shape or curvature of the road segment, an angle of the road segment, and any other suitable information about the road segment (such as a speed limit of the road segment). Additionally, road segment data may include data indicating a road classification, such as motorway, ferry, train, ramp, or street designation. Road segment data can also include data indicating the number of lanes in the road segment.

Similarly, intersection data for an intersection can include, for example, an intersection location, identifiers of one or more road segments that enter the intersection, identifiers of one or more road segments that exit the intersection, any turn lanes or turn restrictions at the intersection, any other suitable information about traversing the intersection.

In some embodiments, navigation guidance data 135 can be generated, for example by the mapping server 105, by processing and/or combining road network data, other existing navigation guidance data 135, or suitable digital map data 130. For example, additional or modified intersection data can be generated by processing existing navigation guidance data 135, such as intersection data and the associated road segment data for each intersection. In some implementations, the additional navigation guidance data 135 can be used to generate navigation instructions for a route. Similarly, the additional navigation guidance data 135 can be used to modify one or more navigation instructions for a route.

In some embodiments, the mapping server 105 can determine and store an intersection type for each intersection as navigation guidance data 135. The intersection type for an intersection indicates the type, function, or category of the intersection. For example, an intersection can have an intersection type of roundabout, sliproad, motorway, street, or other suitable intersection type. In some implementations, additional navigation guidance data 135 may be generated based on the intersection type for an intersection.

In some embodiments, navigation guidance data 135 for an intersection includes a shape of the intersection. Intersection shape data for an intersection can comprise a list of one or more turns possible at the intersection. Each turn can represent the possibility for a user to move from a first road segment to a second road segment associated with the intersection. Therefore, each turn for an intersection can be associated with a road segment connected to the intersection. Similarly, navigation guidance data 135 for an intersection can comprise a list of two or more road segments that connect at the intersection. A list of turns for an intersection can indicate, for each turn, whether entry onto each road segment connected to the intersection is allowed from each other road segment connected to the intersection. Similarly, the list of turns can indicate, for each turn, available modes of travel (such as car, bus only, or bike) for the turn. For example, a turn stored in the navigation guidance data 135 for an intersection can include an entry road segment, one or more available exit road segments, and one or more allowed modes of travel for the turn. For example, a turn for an intersection can represent moving from a road segment representing part of a first road to a second road segment representing part of an intersecting road (that is, turning from the first road onto the intersecting road). Similarly, a turn of an intersection can represent moving through the intersection from a first road segment for a road to a second road segment for the same road (that is, continuing through the intersection on the same road).

Intersection shape data for an intersection can further include an angle for each turn of the one or more turns of the intersection, according to some embodiments. In some implementation, the angle of a turn is determined based on the angle between an entry road segment, and an exit road segment allowed for that turn. For example, assume two roads intersect at 90 degree angles (represented in the road network as four road segments meeting at an intersection). A first road segment may be selected as the entry road segment for the turn, with an associated angle of 0 degrees. The angles associated with the remaining road segments would be 90, 180, and 270 degrees, respectively.

In some embodiments, the intersection shape for each intersection can be normalized into a normalized intersection shape. The road network data may separately define road segments that are part of the same road as individual road segments. A normalized intersection shape can combines two or more road segments that are part of the same road into a single road segment, to more accurately represent the shape of an intersection. For example, for a road that is divided by a median, the each side of the road may be represented by an individual road segment in the road network data. At an intersection that includes the divided road, the intersection shape may indicate six turns: two for the intersecting street, two for the road segments representing one side of the divided road, and two for the road segments representing the other side of the divided road. A normalized intersection shape for the intersection including the divided road can combine the road segments representing the two sides of the divided road into one road segment and may include only four turns (instead of the six of the non-normalized intersection shape).

In some implementations, the navigation guidance data 135 for an intersection can include additional turn information. The turn information for a particular intersection may be based on the intersection type of the intersection. For example, a roundabout type intersection can include turn information associated with each roundabout exit. Similarly, a motorway type intersection can include turn information indicating whether the intersection is an off ramp intersection, on ramp intersection, fork, merge or continuation of the motorway. In some embodiments, turn information for each intersection can be determined based on an intersection type and other suitable information. For example, the turn information for an intersection can include a turn type for each turn of the intersection. Example turn types include on or off ramp, continue, fork, turn, merge, restricted turn, or suppressed turn. An on or off ramp turn type indicates the turn is a transition between a motorway and an on or off ramp. A continue turn type can represent a continuation of the same road, for example, including a name change for the road or a variation in road direction. A fork turn type represents a turn where a plurality of roads that fork from a single road. A restricted turn is a turn that is not allowed or is otherwise not able to be used. A suppressed turn is a turn whose instructions may not be included in a set of navigation instructions, such as when adding instructions for the suppressed turn would be confusing or unneeded. For example, if an intersection includes only two road segments, the only option after entering at the first road segment may be to continue onto the second road segment. Therefore providing navigation instructions for that intersection may be unnecessary and each turn of the intersection can be assigned a "suppressed" turn type. In some embodiments, the turn type for each turn is used to generate navigation instructions corresponding to that turn (for example, instructing a user to "keep right" for a fork turn type rather than to "turn right").

In the embodiment of FIG. 1, navigation guidance data 135 is stored separately from the digital map data 130. In other embodiments, the navigation guidance data 135 may be stored in combination with or as part of the digital map data 130. For example, a map tile of the digital map data 130 can comprise a plurality of data layers that include one or more navigation guidance data layers (comprising navigation guidance data 135). Similarly, digital map data 130 may include road network data, defining a plurality of road segments and a plurality of intersections, according to some embodiments. The digital map data 130 containing the road network data can be processed to generate navigation guidance data 135.

In some embodiments, the mapping application 110 provides an API 112 that may be accessed by a client map application 155 to provide digital mapping functionality to a client device 145 executing the client map application 155. For example, the client map application 155 can interact with the API 112 using the SDK 157. Specifically, the mapping application 110 can comprise program instructions that are programmed or configured to perform a variety of backend functions needed for digital mapping including, but not limited to: receiving requests to generate navigation instructions from client devices 145, sending digital map data 130 to client devices 145, sending navigation instructions to client devices 145, receiving digital map source data 125 from suitable data providers, processing digital map source data 125 to generate digital map data 130, processing digital map data 130 or existing navigation guidance data 135 to generate additional navigation guidance data 135, and any other aspects of embodiments described herein. The mapping application 110 can include a navigation instruction module 115 programmed or configured to generate navigation instructions for digital mapping.

In one embodiment, the navigation instruction module 115 is programmed or configured to receive map data (such as digital map data 130 and/or digital map source data 125) or navigation guidance data 135, determine intersection data representing a plurality of intersections defined by the received map data, and generate navigation guidance data 135 for one or more intersections of the plurality of intersections in the map data. In some embodiments, the navigation instruction module 115 can receive a request to generate navigation instructions between an origin and destination, calculate route data representing a route between the origin and destination, generate a set of navigation instructions for the route, and modify one or more navigation instructions based on navigation guidance data 135 for one or more intersections along the route.

For the purpose of clarity, the foregoing description has ascribed certain operations, functions, and programming to the navigation instruction module 115 of FIG. 1. However, in other embodiments, the same operations, functions, and programming may be implemented in programs or logic that is separate from the navigation instruction module 115, such as a utility program or library. For example, the function of generating a route from a starting point to a destination may be implemented in a separate library that the navigation instruction module 115 calls. As another example, the function of generating navigation guidance data 135 may be implemented in programs or logic that is separate from the function of generating modified navigation instructions. Additionally or alternatively, the navigation instruction module 115 may communicate or interface with any other applications, software, or modules that are executed by the mapping server 105, such as operating systems or drivers, needed to implement the functionality described herein.

Navigation Instruction Generation

Figure 2:
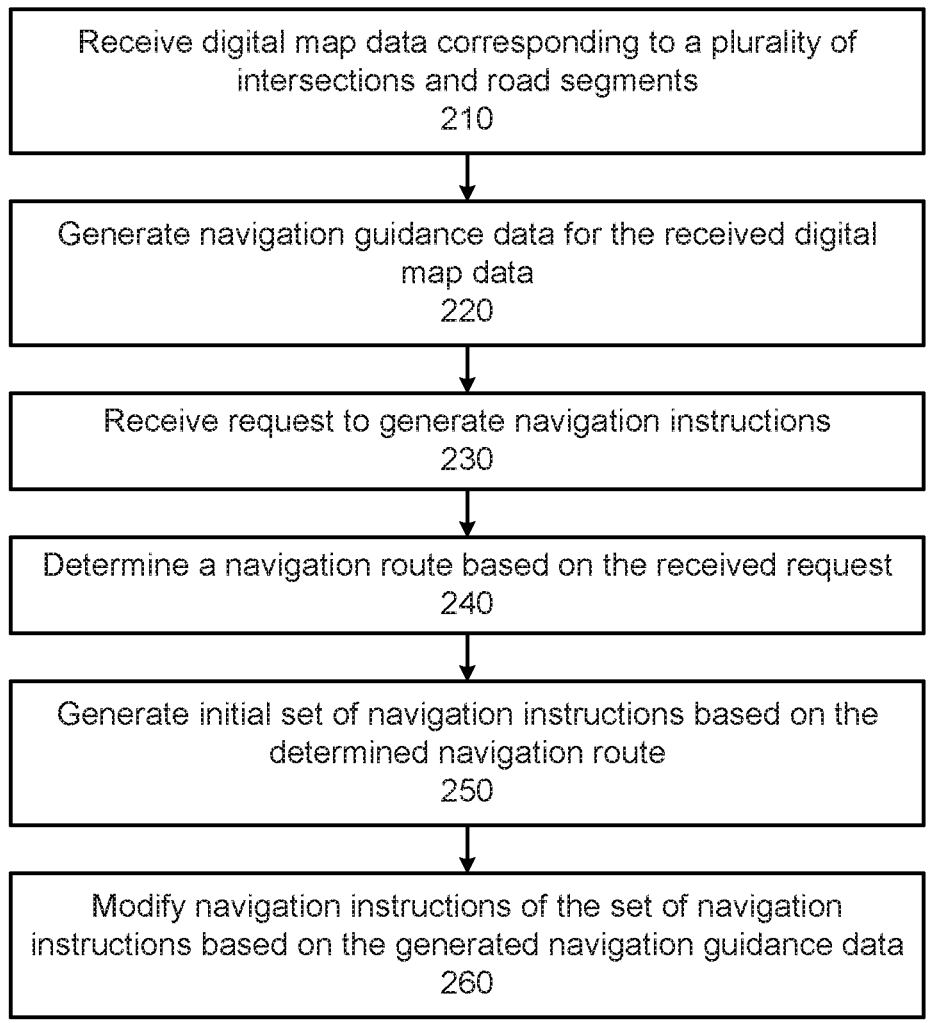
FIG. 2 illustrates an example algorithm or method for generating improved navigation instructions.

FIG. 2 illustrates an example algorithm or method for generating improved navigation instructions. Although the steps of the process of FIG. 2 are shown in an order, the steps of FIG. 2 may be performed in any order, and are not limited to the order shown in FIG. 2. Additionally, some steps may be optional, may be performed multiple times, and/or may be performed by different components, according to some embodiments.

All steps, operations, and functions of flow diagrams described herein are intended to indicate operations that are performed using programming in a special-purpose computer or general-purpose computer, in various embodiments, at the same level of detail that is used by persons of ordinary skill in the art to which the disclosure pertains for communicating with one another about similar computer programs or algorithms. Each flow diagram in this disclosure is a guide, plan or specification of an algorithm for programming a computer to execute the functions that are described herein.

The process 200 begins when the mapping server receives 210 digital map data corresponding to a plurality of intersections and road segments. The received digital map data may be, for example, digital map data 130 retrieved by the mapping server 105 from the database 120. In some embodiments, the received digital map data 130 can be digital map source data, such as digital map source data 125 retrieved from the database 120 or received from another suitable source.

In some embodiments, the digital map data 130 includes intersection data defining a plurality of intersections and road segment data defining a plurality of road segments. For example, the retrieved digital map data 130 can define a plurality of nodes and edges, wherein a node represents an intersection and edges connected to the node represent streets at the intersection.

Generating Navigation Guidance Data

Then, the mapping server can generate 220 navigation guidance data based on the received digital map data. In some embodiments, the received digital map data 130 already includes intersection data defining a plurality of intersections. In other embodiments, the mapping server 105 can identify a plurality of intersections represented in the digital map data 130. For example, the digital map data 130 can include road data defining geometries for a plurality of roads. Based on the road geometries and locations, the mapping server 105 can determine whether two or more roads intersect at an intersection, according to some embodiments. Then the mapping server 105 may generate navigation guidance data 135 defining the identified intersections.

The mapping server 105 can processes one or more intersections of the plurality of intersections to generate additional navigation guidance data 135. In some embodiments, the mapping server 105 determines additional navigation guidance data 135 for each intersection of the plurality of intersections defined in the digital map data 130.

Figure 3:
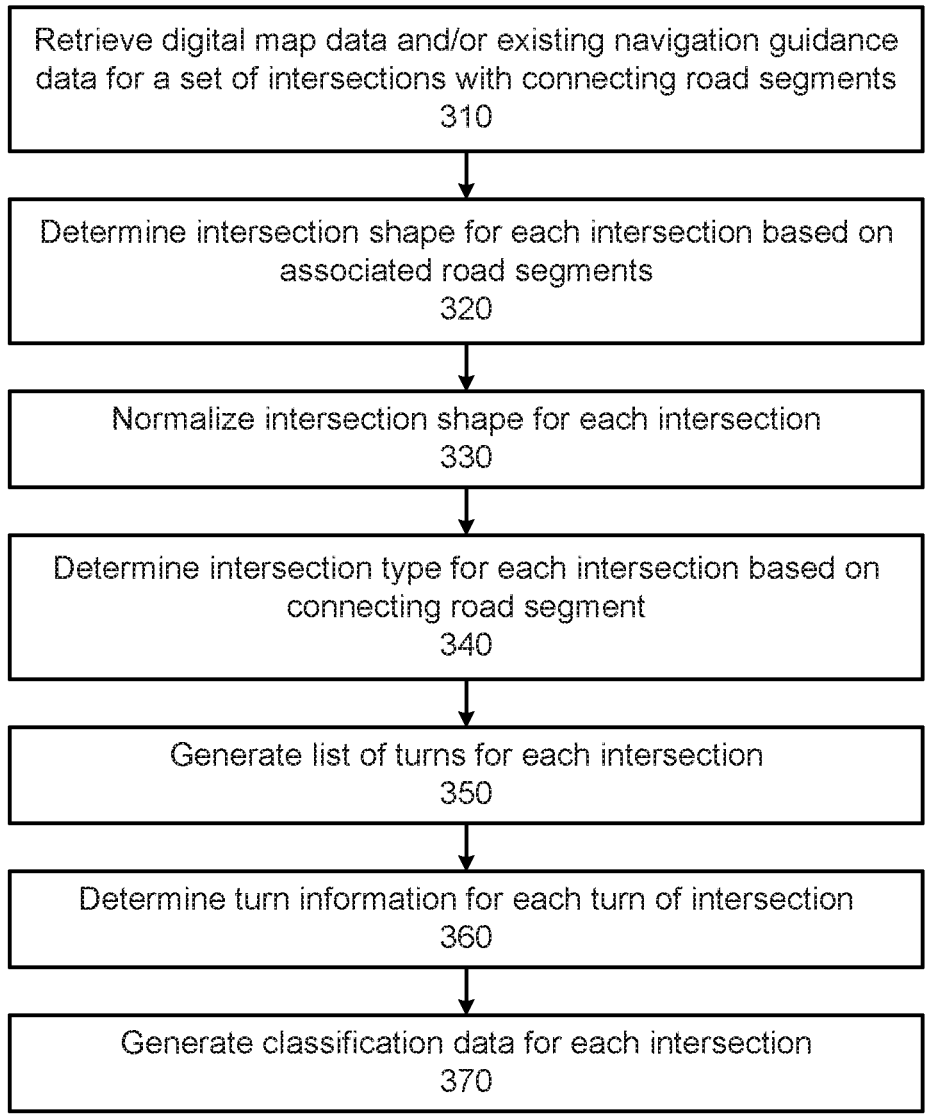
FIG. 3 illustrates an example algorithm or method for generating additional navigation guidance data.

FIG. 3 illustrates an example algorithm or method for generating additional navigation guidance data. Although the steps in FIG. 3 are shown in an order, the steps of FIG. 3 may be performed in any order, and are not limited to the order shown in FIG. 3. Additionally, some steps may be optional, may be performed multiple times, and/or may be performed by different components.

The process 300 of FIG. 3 begins when a mapping server retrieves 310 digital map data or navigation guidance data corresponding to a set of intersections connected by road segments. For example, a mapping server 105 can retrieve digital map data 130 or navigation guidance data 135 stored at the database 120. Then, the mapping server can determiner 320 an intersection shape for each intersection based on the road segments connected to that intersection. The intersection shape for an intersection can comprise a list of turns available at that particular intersection. In some embodiments, determining the intersection shape for an intersection comprises determining a plurality of road segments that intersect at that particular intersection. For example, if the digital map data 130 comprises a plurality of nodes and edges (corresponding to intersections and road segments), the mapping server 105 (for example, using the navigation instruction module 115) may traverse the graph to find edges (road segments) connected to the node representing each intersection. Navigation guidance data 135 may be generated that indicates the intersection shape for each intersection.

In some embodiments, determining the intersection shape for an intersection comprises determining an angle for each turn or road segment of the particular intersection. For each road segment connected to the intersection, an associated angle from a defined entry point to the intersection can be calculated. The entry point for each intersection may be a particular location in the intersection (such as a due north point of the intersection) or may be a particular road segment of one or more road segments connected to the intersection. In some implementations, the associated angle for each road segment can be stored as navigation guidance data 135 for the intersection. In some embodiments, determining the angle for a road segment comprises determining an average angle for the road segment relative to the intersection. For example, assume a road segment connects to the intersection at a first angle but then the next ten meters of the road segment curves to a second angle. The angle associated with that road segment can be based on an average of the first and second angles of the road segment.

Then the mapping server normalizes 330 the generated intersection shape for each intersection, according to some embodiments. Normalizing the intersection shape for an intersection can comprise traversing the road segments connected to the intersection and determining whether two or more road segments defined in the digital map data 130 should be combined into a single road. The navigation guidance data 135 associated with the intersection can then be modified to indicate the normalized intersection shape. Determining that two road segments should be combined to normalize an intersection shape can be based on, for example, road metadata, such as road name or road location, and road geometry. In some embodiments, the intersection shape for an intersection is normalized if the intersection includes a dual carriageway (also referred to as a divided highway) or other road separated by a median. Normalizing a dual carriageway (for example, initially represented by two road segments) for an intersection can comprise generating a single road segment between the two ways of the dual carriageway and replacing the road segments representing the two ways of the dual carriageway with the single road segment, according to some embodiments.

Then the mapping server can determine 340 intersection type for each intersection. For example, an intersection can be a roundabout, sliproad, motorway, fork, or street type intersection. In some embodiments, navigation guidance data 135 is generated associating each intersection with the determined intersection type.

In some embodiments, the digital map data 130 includes intersection data indicating an intersection type for one or more intersections. In other embodiments, the intersection shape and one or more road segments connected to the intersection may be analyzed to determine the intersection type for each intersection. Analyzing one or more road segments connected to the intersection may include, for example, analyzing road classifications, turn angles, or one or more additional intersections connected to the road segments to determine the intersection type.

For example, intersection data for a roundabout may indicate that the intersection type is a roundabout. As another example, a motorway intersection includes a road segment whose road segment data indicates that the road segment classification is motorway. Additionally, the intersecting roads and the angles of the intersecting roads may be analyzed to verify whether the road segment is an actual motorway or a road that was classified or named as a motorway. As another example, a ferry, train, or bicycle intersection may include a switch from a first travel mode to a second travel mode.

In some embodiments, the mapping server then generates 350 a list of turns for each intersection. In some implementations, a list of turns can be generated based on the road segments associated with each intersection. In other embodiments, a list of turns for an intersection can be retrieved from digital map data 130 or navigation guidance data 135 about the intersections.

The mapping server can then determine 360 turn information for the turns of each intersection of the set of intersections. In some embodiments, turn information is associated with particular turns associated with an intersection. The turn information can be generated based on a turn type of the associated turn. In some implementations, the turn information is based on the intersection type of the associated intersection.

In some embodiments, each turn is associated with a turn type. For example, a turn types can include on or off ramp, continue, fork, turn, merge, restricted, or suppressed. An on or off ramp can indicate the turn is onto or off of a motorway from a on or off ramp (or sliproad). A continue type turn can indicate that the turn is a continuation of the same road, which may include a name change for the road or a variation in road direction. Similarly, a fork turn type can indicate that the turn is onto one of a plurality of roads that fork from a single entry road. A turn with a restricted turn type can indicate that the turn that is not allowed, not legal, or is otherwise not able to be used in navigation instructions. In some embodiments, the mapping server 105 generates navigation guidance data 135 associating a turn type with each turn.

In some implementations, each turn is analyzed to determine the associated turn type. In some embodiments, analyzing a turn comprises analyzing the intersection associated with the turn, for example, by analyzing the intersection shape and/or information about one or more road segments connected to the intersection. Analyzing one or more road segments associated with the turn may include, for example, analyzing road classifications, turn angles, or one or more additional intersections connected to the road segments. In some embodiments, a plurality of pre-defined scenarios are each associated with a turn type. Each turn scenario can be defined based on a combination of one or more of: particular road classifications, turn angles, or other road segment and intersection data. Analyzing a turn can comprise determining whether a scenario of the plurality of scenarios is satisfied and associating the turn with the corresponding turn type.

For example, if the particular intersection does not include any other turns, the turn type of the only turn associated with the intersection may be a suppressed turn. In some implementations, navigation instructions are not provided for suppressed turns. That is, if a turn is the only available choice, then a user would continue on the road as if it was the same road and no additional navigation instructions are required.

A turn scenario can comprise a series of decisions or checks. For example, a scenario for a fork may check if a turn has a slight turn angle (for example, a turn angle less than a threshold amount), if the associated intersection includes another slight turn, and if both turns are distinct from all other turns at the intersection. If all three checks are satisfied, then the turn type for the turn can be set to "fork." As another example, if a road classification for a road segment changes from motorway to motorway link, then the turn can be associated with an off ramp turn type.

In some embodiments, turn scenarios can include an analysis for determining whether the turn of a first intersection includes a sliproad and/or highway ramp. This analysis can include determining a second intersection with which a road segment for the turn connects and determining whether another turn at the first intersection leads to the second intersection. Additionally, the analysis may be based on a distance to the second intersection and/or an angle of the turn. The turn information may include data indicating the turn type is a turn and that the turn is onto a sliproad.

In some embodiments, a turn scenario includes an analysis for verifying a turn type based on the angle of the turn. In some implementations, the angle of the turn can determine if the turn is considered a right or left turn. For example, if the turn angle is close to straight, such as within 10 degrees, the turn is considered a continue (straight) type turn instead of a right or left turn of another type. In some implementations, turn type analysis further include analyzing the road type of the connected road segments. If the turn angle for a turn is close to straight and the road classification of the road segments associated with the turn is a motorway, the turn type may be a merge type.

In some embodiments, a turn scenario can include an analysis for determining whether an intersection connecting roundabout road segments (that is, an intersection that is part of a roundabout) is an entry, exit, or continuation of the roundabout. The analysis can include determining the shape of the road segments at the intersection, the shape and size of the roundabout, and the direction of travel for the roundabout. For example, in a country where one drives on the right side of the road, when entering a roundabout, a road segment to the left of an intersection inside the roundabout would be a continuation of the roundabout while a road segment to the right of an intersection inside the roundabout would be an exit of the roundabout. In some implementations, each turn of an intersection inside a roundabout can be associated with turn information indicating if the turn is an exit, entrance, or continuation of the roundabout.

In some embodiments, different turn information is associated with one or more turns of the intersection based on the turn type of each turn and the intersection type of the intersection. For example, if the intersection type is a roundabout, the mapping server 105 can analyze the roundabout to determine the number and location of the exits of the roundabout. The mapping server 105 can then generate turn information for turns of intersections that are part of the roundabout, for example, turn information indicating the number of exits, a location or bearing of each exit, and an exit number or exit name associated with each exit of the roundabout. In some implementations, the mapping server 105 can determine that the exits for a small roundabout should be indicated as turns rather than as roundabout exits. For example, if a roundabout has four exits that are evenly spaced, the exits may be indicated as normal turns and/or the entire roundabout may be treated as a single intersection.

In some embodiments, if the intersection type is a motorway intersection, the mapping sever 105 can analyze the motorway intersection to determine whether the intersection includes an on-ramp, off-ramp, or fork. The mapping server 105 can generate turn information for a particular turn based on the resulting analysis. For example, turn information for a particular turn may indicate whether the turn represents entering the motorway via an on-ramp or exiting via an off-ramp. As another example, if the motorway intersection includes a fork or multiple exits, the associated turn information can indicate the number and location of each fork or exit. Additionally, if there are no other turns associated with the intersection, then the turn information may indicate that there is no turn (for example, by assigning the turn a continuation turn type). That is, and intersection where a motorway ends and becomes another street may only contain one turn from the motorway road segment, and the turn can be assigned a continuous turn type.

In some embodiments, if an intersection is a ferry or train crossing type intersection, the mapping server 105 can generate turn information indicating that the turn is restricted (not able to be used). For example, a turn from a road onto a set of train tracks can be a restricted type turn (not able to be used). Similarly, the mapping server 105 can be configured to suppress or restrict turns for other types of intersections or other types of roads as appropriate.

In some embodiments, if an intersection includes one or more turns with a fork turn type, additional navigation guidance data 135 is generated for each fork type turn, for example indicating a fork direction (i.e. left or right). In some implementations, the navigation guidance data 135 for a fork type turn indicates a fork number for the turn.

After turn information is generated for each turn of an intersection, the mapping server can generate 370 classification information with each intersection. For example, the generated classification information for an intersection can include an entry class and angle class for the intersection. In some implementations, the generated entry and angle classes for an intersection are stored as navigation guidance data 135 for the intersection.

In some embodiments, navigation guidance data 135 is generated that associates each road segment of an intersection with an entry class. The entry class for a road segment can indicate whether that road segment can be entered from the intersection. For example, an intersection that includes a one-way street may have an intersection shape that includes four road segments, but navigation guidance data can be generated to indicate that the road segment representing turning the wrong way down the one-way street cannot be entered from this intersection. Therefore, turns onto a road segment with a "not enterable" entry class can be marked with a "restricted turn" type and not used for navigation instructions, according to some embodiments. In some embodiments, one or more entry classes can be associated with each road segment. For example, each entry class for a road segment may be associated with one or more travel modes. For example, a one-way street may allow bicycles in both directions, but car traffic in only one direction, therefore navigation guidance data 135 for the intersection can indicate that the road segment representing the "wrong way" down the one-way street is not enterable for cars but can be entered for bicycles or pedestrians.

In some embodiments, the mapping server 105 generates navigation guidance data 135 associating each turn of the intersection with an angle class. An angle class for an intersection can comprise a list of available turn bearings for the intersection. In some embodiments, the list of turn bearings for an intersection may be an ordered list, proceeding, for example from the "leftmost" to the "rightmost" turn bearing. In some embodiments, the list of turn bearings includes a turn direction for each turn. A turn direction may be, for example: left, right, slight left, slight right, sharp left, sharp right, and straight. In some implementations, the turn direction for each turn can be calculated based on the angle of the turn.

Figure 5B:
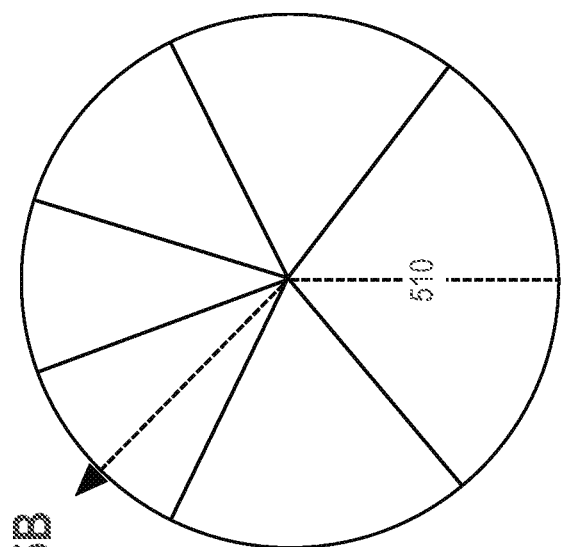
FIG. 5B illustrates an example turn 510 and a turn direction of the turn.
Figure 5A:
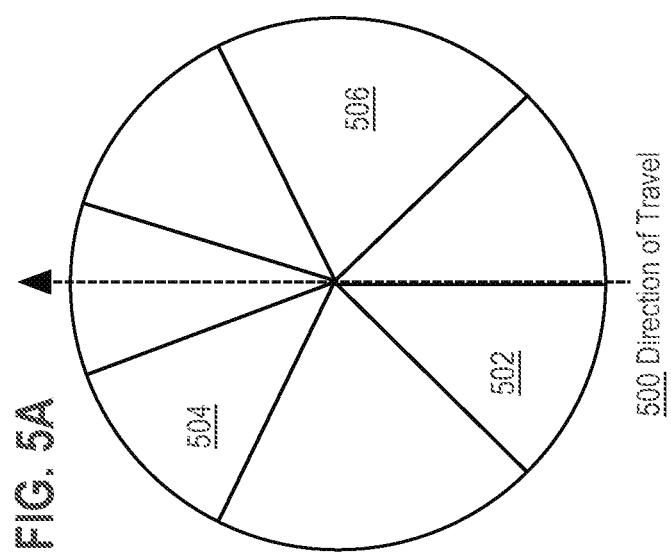
FIG. 5A illustrates an example turn radius diagram for calculating a turn direction for a turn based on the turn angle of the turn.

FIG. 5A illustrates an example turn radius diagram for calculating a turn direction for a turn based on the turn angle of the turn. Relative to the direction of travel 500 (for example, the direction of travel 500 can be the direction and/or angle of the entry road segment for the turn), a circle representing a turn radius can divided into six sections, including section 502, section 504, and section 506. In this embodiment, each section corresponds to a range of turn angles associated with a turn direction. In the illustrated example, section 502 corresponds to a sharp left turn, section 504 corresponds to a slight left turn, and section 506 corresponds to a right turn.

In some implementations, the angle of a turn (relative to the direction of travel of the turn) can be compared against a plurality of ranges of turn angles to determine the corresponding turn direction for the turn. For example, if travelling in direction of travel 500, a turn with a turn angle that falls within the range associated with section 502 can be assigned a turn direction of "sharp left." For example, FIG. 5B illustrates an example turn 510 and a turn direction of the turn. The angle of turn 510 falls within section 504, so the turn direction for the turn 510 is "slight left."

In some embodiments, the turn direction for each turn also depends on the respective turn angles of other turns associated with the intersection. For example, assume two right turns are available at an intersection from a given entry road segment. Alone, each right turn may be assigned a turn direction of "right" (for example, the turn angle of each turn may fall into the section 506 associated with a "right" turn direction). However, with two right turns available from the same entry road segment, one turn may have a turn direction of "sharp right" while the other turn may have a turn direction of "slight right," depending on the angles of the turns relative to the direction of travel of that turn.

In some embodiments, the generated navigation guidance data 135 is stored as additional navigation guidance data 135 in the database 120.

Generating Navigation Instructions

Referring again to FIG. 2, after navigation guidance data is generated for the received digital map data, the mapping server can receive 230 a request to generate navigation instructions, for example, based on the generated navigation guidance data 135. For example, the mapping server 105 can receive a request from a client map application 155 running on a client device 145, from a server computer that provides rendered maps to client devices 145, or from any other suitable source. For example, the mapping server 105 may receive a request for navigation instructions for a map tile corresponding to digital map data 130 and navigation guidance data 135 from the client map application 155 on the client device 145. In some embodiments, a navigation request comprises an origin location (for example, a set of coordinates, road segment, intersection, or other suitable indicator of a location), a destination location, and any other suitable parameters, such as a mode of travel, desired departure time, or the like.

In response to the request, the mapping server can determine 240 a navigation route based on the received request. The mapping server 105 can generate the navigation route using any known methods or algorithms for calculating a path or route between two locations. For example, intersections and road segments may be stored as graph data. The mapping server 105 can then use a shortest path algorithm with the graph data to calculate a suitable navigation route. In some embodiments, each navigation route comprises a plurality of steps. Each step of the navigation route can include an intersection, road segment, and/or turn associated with that step. The navigation route data may comprise an ordered list of steps. Similarly, the navigation route may comprise a sequence of intersections and road segments.

Based on the navigation route, the mapping server can generate 250 an initial set of navigation instructions for the navigation route. In some implementations, a corresponding navigation instruction is generated for each step of the navigation route. Similarly, a navigation instruction can be generated based on a plurality or sequence of steps of the navigation route. For example, a turn (in an intersection step) onto a road (road segment step) can have a corresponding navigation instruction. In some embodiments, each navigation instruction can comprise an instruction type (for example, turn or continuation), instruction text to be relayed to a user (for example "take the next right"), lane recommendations, or other suitable metadata about the navigation route or the intersection.

In some embodiments, the navigation instruction for a step is generated based on road segment data associated with that step. For example, the navigation guidance data 135 can indicate a street name for a road segment. The street name may be used in the navigation instruction to indicate the street associated with the step. Additionally, the road segment data may indicate a distance or length of the road segment. The associated navigation instruction may include a distance associated with the step.

In some embodiments, each navigation instruction can be generated based on the turn information associated with the step of the navigation route. For example, if a suppressed turn is associated with a step of the navigation route, then a navigation instruction is not generated for the step associated with the turn. Similarly, if the turn type for a turn is an on ramp or off ramp, the navigation instructions associated with those steps of the navigation route can indicate entering or exiting a motorway, rather than turning onto a street. In some embodiments, if a step of the navigation route includes a turn, the navigation instruction associated with that step can include a turn direction for the turn. For example, the turn direction for each turn can be stored as navigation guidance data 135. As described above, a turn direction for a turn can be calculated based on the angle of the turn indicated in the navigation guidance data 135.

In some embodiments, if the intersection data indicates that the intersection is a roundabout, then the navigation instructions for steps associated with the intersection can indicate entering or exiting the roundabout, rather than merging onto a street and turning at a particular road. Similarly, in some embodiments, if the intersection data indicates that the turn is a sliproad, the navigation instructions associated with the sliproad road segment can indicate a single turn, rather than a turn onto the sliproad and followed by a merge onto the main road. Additionally, separate navigation instructions can for turning onto the sliproad and merging onto the main road can be generated and then combined below in response to the step 260.

Modifying Navigation Instructions

Figure 4:
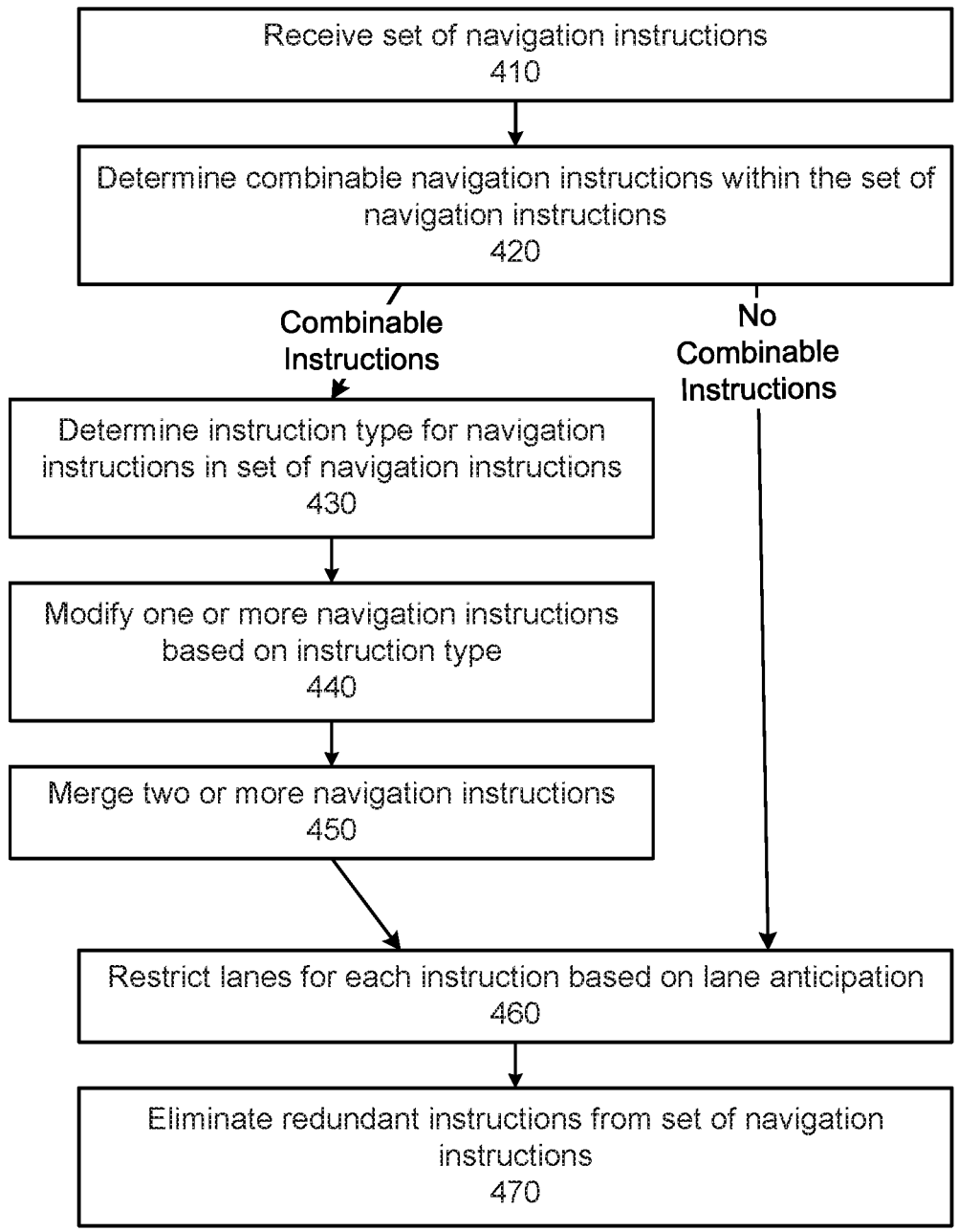
FIG. 4 illustrates an example method for combining and modifying a set of navigation instructions.

In some embodiments, the mapping server modifies the set of navigation instructions based on the generated navigation guidance data. For example, the mapping server 105 can combine several navigation instructions for clarity, or may add lane recommendations to one or more navigation instructions. FIG. 4 illustrates an example method for combining and modifying a set of navigation instructions. Although the steps in FIG. 4 are shown in an order, the steps of FIG. 4 may be performed in any order, and are not limited to the order shown in FIG. 4. Additionally, some steps may be optional, may be performed multiple times, and/or may be performed by different components, according to some embodiments.

The process 400 of FIG. 4 begins when a set of navigation instructions is received 410. In some implementations, navigation instructions can be generated by the navigation instruction module 115 based on a route between an origin and destination location. Then, the set of navigation instructions can be analyzed to determine 420 which (if any) navigation instructions of the received set are combinable. In some embodiments, determining that an instruction is combinable can indicate that the combinable instruction could potentially be merged with other suitable instructions to improve the clarity of the set of navigation instructions. However, not all combinable instructions must be merged for each set of navigation instructions, according to some embodiments.

For example, the navigation instruction module can determine whether an instruction is combinable is based on the intersection type of an intersection associated with the instruction. For example, instructions for a roundabout, sliproad, or highway ramp type intersection may be combinable, while instructions for street or fork type intersections may not be combinable. In other embodiments, navigation guidance data 135 for an intersection can indicate whether instructions associated with the intersection are combinable.

In some embodiments, the set of navigation instructions is compared to a plurality of defined scenarios to determine combinable navigation instructions. Each scenario can specify a particular sequence of road segment types, intersection shapes, turn types, turn angles, time or distance between instructions, or any other suitable criteria. An instruction or sequence of instructions can be determined to be combinable if the instruction or set of instructions satisfy one or more of the scenarios. For example, a sequence of two turns at immediately adjacent intersections may be determined to fit a scenario for "adjacent turns" and be considered combinable instructions.

In some implementations, if the set of navigation instructions does not include any combinable instructions, then the method proceeds directly to step 460, as steps 430-450 deal with merging combinable instructions. If the set of navigation instructions includes combinable navigation instructions, then each combinable instruction is analyzed to determine whether that instruction should be modified and/or merged with another navigation instruction of the set of navigation instructions.

To determine which instructions of the set of navigation instructions should be combined, the mapping server can determine 430 an instruction type for each navigation instruction of the set of navigation instructions. An instruction type may be, for example, merge, on ramp, end of road, fork, continue, new name, or suppressed. In some embodiments, the instruction type for an instruction can be determined based on the turn type of a turn associated with the navigation instruction. For example, in some implementations, an instruction type can be pre-generated and associated with each turn of each intersection. The stored instruction types can then be referenced by the mapping server 105 (for example in step 430) in order to further modify or combine the associated instructions.

In some embodiments, the mapping server then modifies 440 one or more instructions of the set of navigation instructions based on the instruction type associated with that instruction. For example, the mapping server 105 can modify a roundabout type navigation instruction to indicate an exit number for the roundabout. For example, assuming a roundabout with five exits, and a navigation route can include instruction for entering the roundabout at entrance three and exiting at exit five. The number of exits between the entrance and the particular exit may be determined and relayed in the navigation instruction. The navigation instruction corresponding to the roundabout can then be modified to indicate the exit number relative to the entrance. For example, the navigation instruction can be modified to recite "taking the second exit to the roundabout."

In some embodiments, if the turn includes a sliproad or highway ramp, then the navigation instruction corresponding to the turn onto the sliproad may be modified to instruct the user to turn onto the main road via the sliproad, rather than to turn onto the sliproad and, for example, only mentioning the main road in the next instruction. Similarly, modifying the instruction corresponding to a turn onto a sliproad can include determining a street name of the main road from a later navigation instruction in the sequence, or from any other suitable source. In some embodiments, the navigation instruction corresponding to the turn onto the sliproad can be merged with the navigation instruction indicating the turn from the sliproad onto the main road.

Then, the mapping server merges 450 two or more navigation instructions, for example based on the instruction types of the merged instructions, based on the merged instructions following a scenario, or based on any suitable factor. In some implementations, at least one of each instruction merged instruction is a combinable instruction. Merging two or more instructions can include merging one or more of: instruction types, instruction text, lane data, or metadata representing turn information for the merged instruction. In some embodiments, turn information includes street names for the turn, destination signs, or turn lanes.

In some embodiments, two or more instructions can be merged based on an analysis of the turns corresponding to the two or more instructions. For example, the two or more turns may be analyzed to determine whether they correspond to a particular scenario of a plurality of pre-defined scenarios. The two or more instructions can then be combined based on the particular scenario. For example, if the turn angle for two turns associated with adjacent instructions are similar, then the instructions for the two turns may be combined by the navigation instruction module 115. For example, a first turn may have a first turn angle that is close to straight, and the following turn may have a second turn angle that is also close to straight. The navigation instructions for the two turns may be combined into a single navigation instruction for continuing on the road. As another example, a first slight right turn may be followed within a short distance by another slight right turn, such that the combination of the two turns forms a regular right turn. The navigation instructions for the two slight right turns can then be combined into a single navigation instruction to turn right. For example, the mapping server 105 can modify a set of roundabout type navigation instructions (for example, corresponding to intersections representing turning onto a roundabout and exiting the roundabout) into a single navigation instruction instructing a user to, for example, "take the second exit at the roundabout.

In some embodiments, two consecutive instruction may be associated with two turns which represent making a U-turn on the same street. Therefore, the two instructions may be combined into a single navigation instruction to perform a U-turn. In some implementations, metadata representing the street names for the instructions may be combined or modified to indicate making the U-turn on a single street.

In some embodiments, a continue type instruction instructing the user to continue onto the same street as the previous instruction, or in a scenario where the navigation instruction is the same as a previous instruction but associated with a new street name, then the mapping server 105 can combine the continue instruction (or repeated instruction) with the previous instruction.

After potentially combinable instructions in the set of instructions are analyzed and merged as appropriate, or if there are no combinable instructions in the set of navigation instructions, the mapping server can restrict 460 available lanes for each navigation instruction using lane anticipation techniques. In some implementations, some turns may have lane restrictions for legally making the turn (for example, turning right at a specific intersection requiring the use of the rightmost lane at a particular intersection or continuing along a road requiring the use of a middle lane). In these cases the navigation instruction associated with that turn can recite the lane restriction, for example "using the middle two lanes, continue on the highway." However, in some cases required lanes for a first instruction may influence the recommended lanes for a previous instruction. For example, when making a left turn followed by an immediate right turn, the navigation instruction for the initial left turn may recommend using the rightmost left turn lane and to turn into the rightmost lane to set up for the next instruction (the right turn) without requiring multiple lane changes in a short amount of time. Therefore, in some embodiments, the mapping server 105 uses lane anticipation techniques to determine recommended lanes for a navigation instruction based on subsequent navigation instructions in the set of navigation instructions. Lane anticipation techniques can allow the mapping server 105 to determine whether a navigation instruction should recommend the use of one or more specific lanes to perform that navigation instruction. A lane anticipation analysis for any given navigation instruction can use the intersection and turn associated with the given navigation instruction, the intersection and turn associated with any subsequent navigation instructions in the set of navigation instructions, a distance or estimated elapsed time associated between the given navigation instruction and any of the subsequent navigation instructions, and any other suitable information. In some implementations, lane anticipation analysis is only performed on navigation instructions with less than a threshold distance (or expected elapsed time) between the given navigation instruction and the subsequent navigation instruction (as given sufficient time a user can make a lane change as required). Similarly, lane anticipation analysis may only be performed for modes of travel where lane information is available or required (for example, lane anticipation can be performed for car travel, but not for pedestrian travel).

In some implementations, lane anticipation analysis for a given navigation instruction is based on the number of available lanes for the navigation instruction and the turn direction of the subsequent instruction of the set of navigation instructions. One or more turn lanes for the given navigation instruction may be selected for the given navigation instruction based on the turn direction of the subsequent instruction. For example, if the turn associated with the given instruction has two available lanes (for example, a right turn at an intersection with two right turn lanes), the rightmost available lane may be selected when the subsequent instruction includes a right turn. Similarly, the leftmost available lane (the lane second from the right lane in this example) may be selected when the subsequent instruction includes a left turn.

In some embodiments, the set of navigation instructions for a navigation route are traversed in reverse order to determine recommended lanes for each navigation instruction. In some embodiment, two or more instructions may be grouped based on whether the instructions may require the user to make quick lane changes between the navigation instructions. Two navigation instructions can require a quick lane change when a user has a short time or a short distance in which to change lanes between the two instructions (if a lane change is necessary). If a group of instructions includes a quick lane change, lane recommendations may be propagated backwards from the last instruction in the group through the first, in order to minimize or eliminate the number of quick lane changes a user might have to make while following the navigation instructions. For example, if the last instruction in a group of navigation instructions requires the left-most lane to perform, the lane recommendation of "left-most lane" can be propagated to the previous instruction, and so on. In some embodiments, a lane recommendation is only determined for a navigation instruction if lane information is available in the associated road segment data or intersection data. In some embodiments, lane restrictions are only determined for a navigation instruction if the number of lanes in the previous instruction is higher than the number of lanes in the current instruction.

FIGS. 6A and 6B illustrate example situation for recommending lanes using lane anticipation. FIG. 6A illustrates a route 600 to a desired location 610. For example, the desired location 610 can be a destination of the route 600, or any intermediate point on the route 600. In the embodiment of FIG. 6A, the route 600 includes three intersections A-C 620-626 in quick succession, illustrated here by dotted boxes. At each of the intersections A-C 620-626 each turn associated with an incoming road segment may require the use of a specific lane. Based on a lane anticipation analysis, a specific recommended lane 630 is recommended for the navigation route 600. For example, the intersection A 620 includes four lanes. One lane continues straight while three (including the recommended lane 630) turn right. Although the route 600 contains a right turn at the intersection 620, the following instruction for the intersection B 622 is a left turn. Thus, the right turn at intersection A 620 can be recommended to use the two lanes (including the recommended lane 630) that can result in a left turn at intersection B 622. At intersection C 624, one lane continues straight while the other lane turns right. As the route 600 continues straight, the navigation instruction associated with intersection B 622 can recommend using the recommended lane 630 (the lane that continues straight). In some embodiments, the navigation instruction associated with intersection A 620 can be further restricted to recommend only the recommended lane 630 based on the lane recommendation for the intersection B 622.

Similarly, FIG. 6B illustrates a route 650 to a desired location 660. The desired location 660 can be the destination of the route 650, or any intermediate point on the route 650. The route 650 includes two intersections, intersection A 670 and intersection B 675. Based on a lane anticipation analysis, a specific recommended lane 680 is recommended for the navigation route 650. At the intersection A 670, the intersection forks into several directions, and the lane usage for intersection A 670 can be restricting to a continuing lane (including the recommended lane 680). Similarly, at intersection B 675, the intersection forks, leaving only the recommended lane continuing to the desired location 660. In some embodiments, the recommended lanes for intersection A 670 can be further limited to the recommended lane 680, based on the shape and desired turn at the later intersection B 675.

In some embodiments, analyzing a subsequent instruction includes determining a distance between the particular instruction and the future instruction. A larger distance or longer time to the subsequent instruction may allow a greater number of lane changes. In other words, if the subsequent instruction is further away, any number of lanes may be used.

After lane information is added to the set of navigation instructions, the mapping server can then eliminate 470 redundant instructions from the set of navigation instructions. For example, an instruction that includes a name change that covers a short road segment may be eliminated as unnecessary. As another example, a lane restriction on a single lane for a continue instruction may be omitted.

In some implementations, the mapping server 105 causes the improved navigation instructions to be displayed or relayed to a user. Similarly, the mapping server 105 can cause the navigation route to be highlighted in a digital map displayed in a client map application 155 (or to be otherwise rendered by the mapping server 105). For example, by sending the improved navigation instructions to the client map application 155 or other device that sent the request to generate navigation instructions.

Example Hardware

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
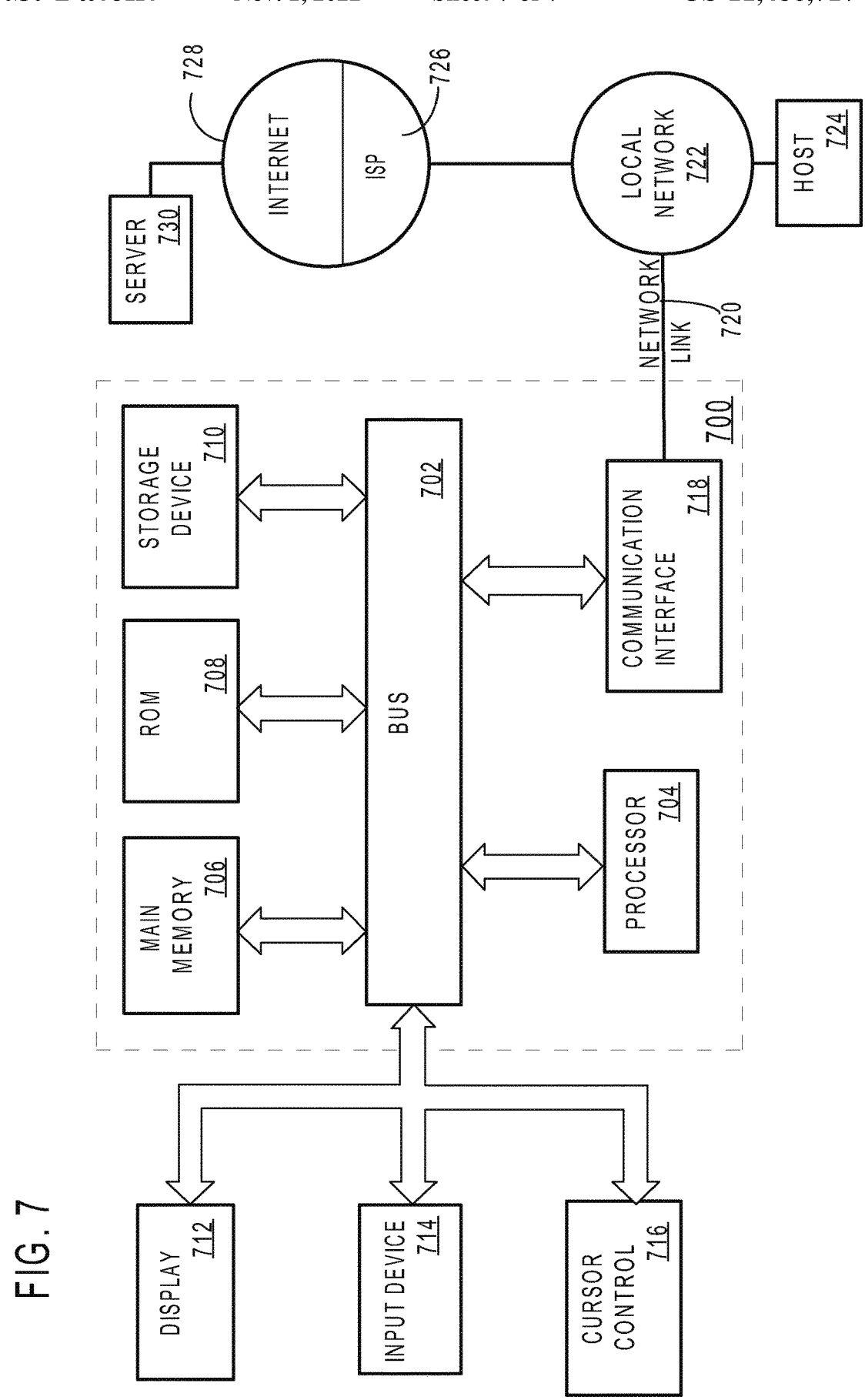
FIG. 7 illustrates an example computer system upon which an embodiment may be implemented.

For example, FIG. 7 is a block diagram that illustrates an example computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for generating improved navigation instructions, the method comprising:
   receiving, at a mapping server, digital map data about a geographic area, the digital map data comprising a plurality of intersections connected by road segments;
   generating navigation guidance data for one or more intersections of the plurality of intersections;
   receiving, at the mapping server from a client device, a request to generate navigation instructions for traversing from an origin location to a destination location;

responsive to the request, calculating a navigation route from the origin location to the destination location, wherein the navigation route comprises an ordered sequence of steps connecting the origin location and the destination location, each step associated with one or more intersections and road segments, and one or more steps associated with intersections comprising navigation guidance data;

generating a set of navigation instructions for the navigation route, the set of navigation instructions having an associated plurality of instruction types classifying the navigation instructions as representing one or more of a vehicle movement or vehicle traffic infrastructure;

modifying one or more instructions of the set of navigation instructions based on the navigation guidance data by:

determining, based on at least one of the associated plurality of instruction types or the guidance data, whether a first navigation instruction of the set of navigation instructions is combinable;

responsive to determining that the first navigation instruction is combinable, determining a first instruction type for the first navigation instruction;

determining that the first instruction type is a ramp type;

merging the first navigation instruction comprising a sliproad with a second navigation instruction to generate a third navigation instruction, the second navigation instruction comprising a road onto which a turn from the sliproad is to be made, the third navigation instruction directing a user to turn onto the road via the sliproad;

merging a fourth navigation instruction with a fifth navigation instruction to generate a sixth navigation instruction by:

determining that a fourth instruction type for the fourth navigation instruction is a roundabout type;

determining an exit number at which to exit the roundabout to arrive at the destination location; and merging the fourth navigation instruction comprising an entrance number at which to enter the roundabout with the fifth navigation instruction comprising the exit number, the sixth navigation instruction including a number of exits between the entrance number and the exit number; and transmitting, from the mapping server to the client device, the set of navigation instructions comprising the third navigation instruction.

2. The method of claim 1 wherein generating navigation guidance data for one or more intersections of the plurality of intersections comprises:

determining a shape of a first intersection of the plurality of intersections;

normalizing the shape of the first intersection; and generating navigation guidance data associating the normalized shape of the first intersection with the first intersection.

3. The method of claim 1 wherein generating navigation guidance data for one or more intersections of the plurality of intersections comprises:

determining an intersection classification of a first intersection of the plurality of intersections; and associating, in the navigation guidance data, the determined intersection classification with the first intersection.

4. The method of claim 1 wherein generating navigation guidance data for one or more intersections of the plurality of intersections comprises:

determining an intersection type of a first intersection of the plurality of intersections; and based on the determined intersection type, associating, in the navigation guidance data, particular turn information with the first intersection.

5. The method of claim 1, wherein merging the first navigation instruction with the second navigation to generate the third navigation instruction comprises merging instruction text conveying information about the navigation instruction to be relayed to a user following the navigation route.

6. The method of claim 1, wherein merging the first navigation instruction with the second navigation instruction to generate the third navigation instruction comprises combining lane data representing different lanes.

7. The method of claim 1, wherein merging the first navigation instruction with the second navigation instruction to generate the third navigation instruction comprises combining instruction metadata representing turn information.

8. The method of claim 1, further comprising:

determining that instruction types for a seventh navigation instruction and an eighth navigation instruction of the set of navigation instructions are the same.

9. The method of claim 1, wherein a given pair of navigation instructions having instruction types selected from the group of roundabout type, sliproad type, or highway ramp type is combinable and wherein the given pair of navigation instructions having instruction types selected from the group of street type or fork type is not combinable.

10. The method of claim 1, wherein the plurality of instruction types includes one or more of an intersection type, turn type, roundabout type, merge type, ramp type, end of road type, fork type, continue type, new name type, or suppressed type.

11. A system comprising at least one processor and a non-transitory computer-readable storage medium storing computer program instructions that, when executed by the at least one processor, cause the at least one processor to:

receive, at a mapping server, digital map data about a geographic area, the digital map data comprising a plurality of intersections connected by road segments;

generate navigation guidance data for one or more intersections of the plurality of intersections;

receive, at the mapping server from a client device, a request to generate navigation instructions for traversing from an origin location to a destination location;

responsive to the request, calculate a navigation route from the origin location to the destination location, wherein the navigation route comprises an ordered sequence of steps connecting the origin location and the destination location, each step associated with one or more intersections and road segments, and one or more steps associated with intersections comprising navigation guidance data;

generate a set of navigation instructions for the navigation route, the set of navigation instructions having an associated plurality of instruction types classifying the navigation instructions as representing one or more of a vehicle movement or vehicle traffic infrastructure, wherein a given pair of navigation instructions having instruction types selected from the group of roundabout type, sliproad type, or highway ramp type is combinable and wherein the given pair of navigation instructions having instruction types selected from the group of street type or fork type is not combinable;
modify one or more instructions of the set of navigation instructions based on the navigation guidance data by:
   determining, based on at least one of the associated plurality of instruction types or the guidance data, whether a first navigation instruction of the set of navigation instructions is combinable;
   responsive to determining that the first navigation instruction is combinable, determining a first instruction type for the first navigation instruction; and
   merging the first navigation instruction with a second navigation instruction of the set of navigation instructions to generate a third navigation instruction, the second navigation instruction having a second instruction type combinable with the first instruction type; and
transmit, from the mapping server to the client device, the set of navigation instructions comprising the third navigation instruction.

12. A non-transitory computer-readable storage medium storing computer program instructions that, when executed by at least one processor, cause the at least one processor to:
receive, at a mapping server, digital map data about a geographic area, the digital map data comprising a plurality of intersections connected by road segments;
generate navigation guidance data for one or more intersections of the plurality of intersections;
receive, at the mapping server from a client device, a request to generate navigation instructions for traversing from an origin location to a destination location;
responsive to the request, calculate a navigation route from the origin location to the destination location, wherein the navigation route comprises an ordered sequence of steps connecting the origin location and the destination location, each step associated with one or more intersections and road segments, and one or more steps associated with intersections comprising navigation guidance data;
generate a set of navigation instructions for the navigation route, the set of navigation instructions having an associated plurality of instruction types classifying the navigation instructions as representing one or more of a vehicle movement or vehicle traffic infrastructure;
modify one or more instructions of the set of navigation instructions based on the navigation guidance data by:
   determining, based on at least one of the associated plurality of instruction types or the guidance data, whether a first navigation instruction of the set of navigation instructions is combinable;
   responsive to determining that the first navigation instruction is combinable, determining a first instruction type for the first navigation instruction;
   determining that the first instruction type is a ramp type;
   merging the first navigation instruction comprising a sliproad with a second navigation instruction to generate a third navigation instruction, the second navigation instruction comprising a road onto which a turn from the sliproad is to be made, the third navigation instruction directing a user to turn onto the road via the sliproad;
   merging a fourth navigation instruction with a fifth navigation instruction to generate a sixth navigation instruction by:
      determining that a fourth instruction type for the fourth navigation instruction is a roundabout type;
      determining an exit number at which to exit the roundabout to arrive at the destination location; and
      merging the fourth navigation instruction comprising an entrance number at which to enter the roundabout with the fifth navigation instruction comprising the exit number, the sixth navigation instruction including a number of exits between the entrance number and the exit number; and
transmit, from the mapping server to the client device, the set of navigation instructions comprising the third navigation instruction.

* * * * *